United States Patent [19]
Kim et al.

[11] Patent Number: 5,968,392
[45] Date of Patent: Oct. 19, 1999

[54] ROLLER HAVING HEATER FOR ROLLING ELECTRODE COMPOSITE PLATE OF ELECTRICAL STORAGE CELL

[75] Inventors: Chan-soo Kim, Suwon; Jeong-soon Shin, Seoul, both of Rep. of Korea

[73] Assignee: Samsung Display Devices Co., Ltd., Kyungki-do, Rep. of Korea

[21] Appl. No.: 08/874,505

[22] Filed: Jun. 13, 1997

[30] Foreign Application Priority Data

Sep. 5, 1996 [KR] Rep. of Korea ............... 96-38444

[51] Int. Cl.⁶ ..................... B21B 27/06; H05B 1/00
[52] U.S. Cl. ..................... 219/470; 219/469; 219/216
[58] Field of Search ..................... 219/469, 470, 219/216

[56] References Cited

U.S. PATENT DOCUMENTS

| | | | |
|---|---|---|---|
| 3,310,655 | 3/1967 | Hager | 219/469 |
| 4,284,875 | 8/1981 | Namiki | 219/216 |
| 4,469,549 | 9/1984 | Dietrich | 156/579 |
| 4,684,784 | 8/1987 | Tamary | 219/216 |
| 5,420,395 | 5/1995 | Hyllberg | 219/216 |
| 5,532,807 | 7/1996 | Takemoto | 355/289 |
| 5,757,664 | 5/1998 | Fukuda | 399/33 |

*Primary Examiner*—Teresa Walberg
*Assistant Examiner*—Thor S. Campbell
*Attorney, Agent, or Firm*—Leydig, Voit & Mayer, Ltd.

[57] ABSTRACT

A roller for rolling an electrode composite plate of a storage cell, including a cylindrical body having an inner space and a heater installed in the body for heating the electrode composite plate is provided.

According to the present invention, it is possible to prevent stress concentrations and to easily perform thickness control and winding by heating and rolling the electrode composite plate during manufacturing of a cylindrical electrical storage cell.

5 Claims, 3 Drawing Sheets

ROLLER HAVING HEATER FOR ROLLING ELECTRODE COMPOSITE PLATE OF ELECTRICAL STORAGE CELL

BACKGROUND OF THE INVENTION

The present invention relates to a roller for rolling an electrode composite plate of an electrical storage cell, and more particularly, to a roller for rolling an electrode composite plate having a heater to easily control the thickness of the electrode composite plate and to easily perform winding during rolling of the electrode composite plate.

An electrode composite plate 10 which is wound into a roll, as shown in FIG. 1, is installed inside a cylindrical case (not shown) of a cylindrical storage cell such as a nickel-hydrogen storage cell. The electrode composite plate 10 includes an anode electrode plate 11, a cathode electrode plate 12, and an insulating separator 13 disposed between the electrode plates 11 and 12.

The above electrode composite plate 10, as shown in FIG. 2, is manufactured by rolling and winding a plurality of rollers 21. The electrode composite plate 10 is pressed by the rollers 21, rolled to an appropriate thickness and then wound.

Active material layers (not shown) coated on the anode and cathode electrode composite plates 11 and 12 (FIG. 1) may crack or break during the performance of the above operations, thus deteriorating the performance and life of the cell. Such cracking and breaking are caused by the uneven speeds at which the electrode composite plate 10 is wound and at which the electrode composite plate 10 is supplied. The cracking and breaking is more severe as the winding diameter of the electrode composite plate 10 increases. In particular, when there is a difference in the speed at which the electrode composite plate 10 is supplied and the speed at which the electrode composite plate 10 is wound, different stresses are distributed in the respective portions of the electrode composite plate 10. Consequently, wrinkled or elongated portions may be generated due to the difference in stress distribution. It is hard to compensate for such non-uniform portions during rolling.

Also, the thickness of the electrode composite plate 10 should be controlled to be less than a certain range in order to increase the capacity of the cell and the overall thickness of the electrode composite plate 10 should be uniform by rolling of the electrode composite plate 10. If the thickness of the electrode composite plate 10 varies at different portions, the cracking and breaking of the active material becomes more serious during winding the electrode composite plate 10 and the electrode composite plate 10 cannot be tightly wound, thus reducing the capacity of the cell.

Means for correcting the difference of the stress distribution and facilitating control the thickness of the electrode composite plate are not provided in a conventional roller for rolling an electrode composite plate for a cell.

SUMMARY OF THE INVENTION

It is an object of the present invention to provide a roller for rolling an electrode composite plate for a cell having a heater to facilitate control of the thickness of the electrode composite plate and winding.

To achieve the above object, there is provided a roller for rolling an electrode composite plate for a cell according to the present invention, comprising a cylindrical body having an inner space and heating device installed in the body for heating the electrode composite plate.

The heating device is preferably a heating line buried under the outer surface of the body.

Also, a coating layer which contacts the electrode composite plate is coated on the outer surface of the body.

Also, the heating device further comprises a heater installed in the inner space of the body.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 3:
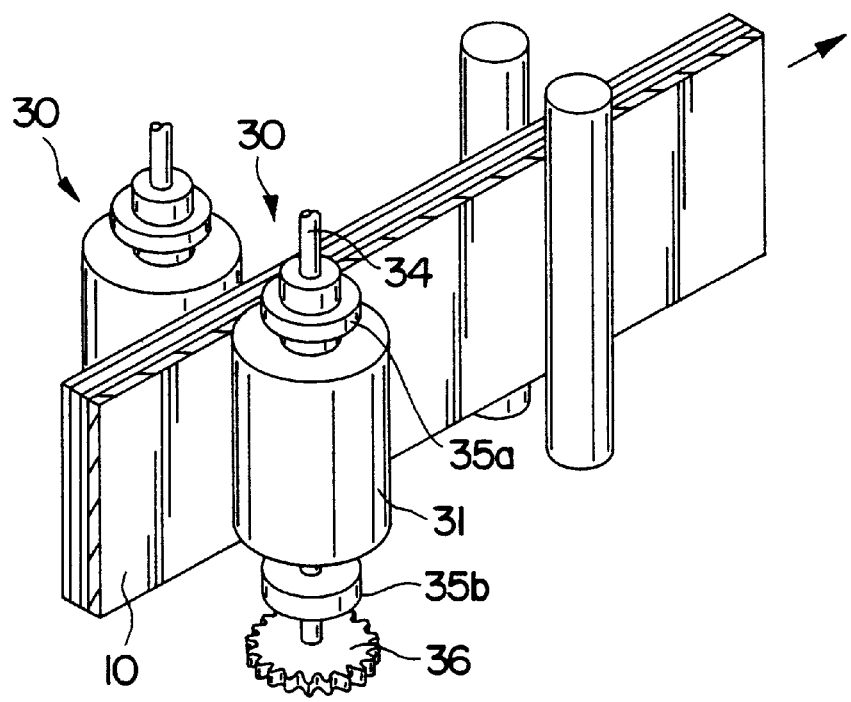
FIG. 3 is a schematical perspective view showing the state in which a roller for rolling an electrode composite plate for a storage cell according to the present invention is used.

Referring to FIG. 3, rollers 30 for rolling an electrode composite plate of a cell according to the present invention installed at both sides of the electrode composite plate 10 press and roll the electrode composite plate 10. At least a pair of rollers 30 should be provided according to the manufactured electrode composite plate 10.

Figure 4:
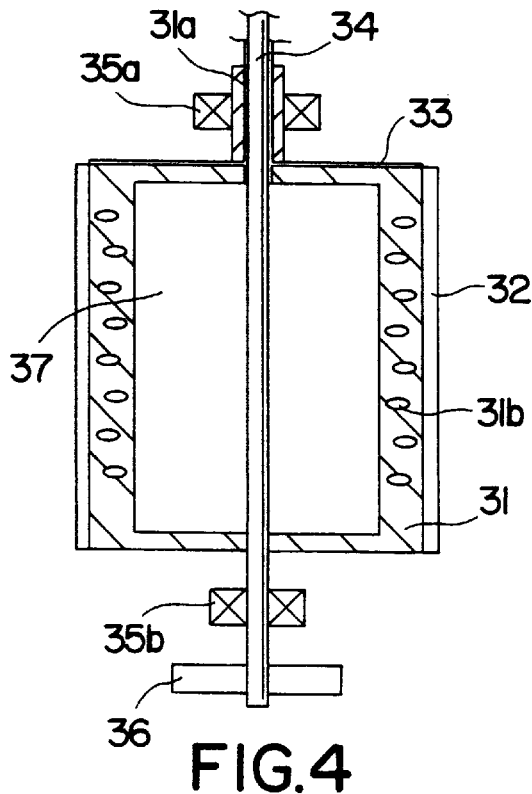
FIG. 4 is a sectional view showing the roller of FIG. 3.

The roller 30 of the present invention includes a cylindrical body 31 as shown in FIG. 4. Transformation preventing pores 31b are formed in the body 31. The diameter of the transformation preventing pores 31b is about 0.5 to 1.0 mm. The transformation preventing pores 31b are preferably formed to be spaced at approximately 5 to 7 mm from each other.

A coating layer 32 is formed on the outer circumference of the body 31. It is preferable that the coating layer 32 be resistant to abrasion, have a high degree of hardness and the surface is relatively smooth. Also, a heating line 33 is buried at a predetermined distance between the outer circumference of the body 31 and the coating layer 32. The heating line 33 is connected to an external power source (not shown) through a hole 31a formed in the body 31 in an axial direction.

A roll shaft 34 passes through the hole 31a formed in the body 31 and is combined with a driving gear connected to a driving means (not shown). The body 31 and the roll shaft 34 are rotatably supported by bearings 35a and 35b.

Also, a space 37 for preventing heat generated by the heating line 33 buried in the surface of the body 31 from being transmitted to the inside of the body 31 is formed inside the cylindrical body 31. The space 37 is preferably filled with an adiabatic material.

Figure 1:
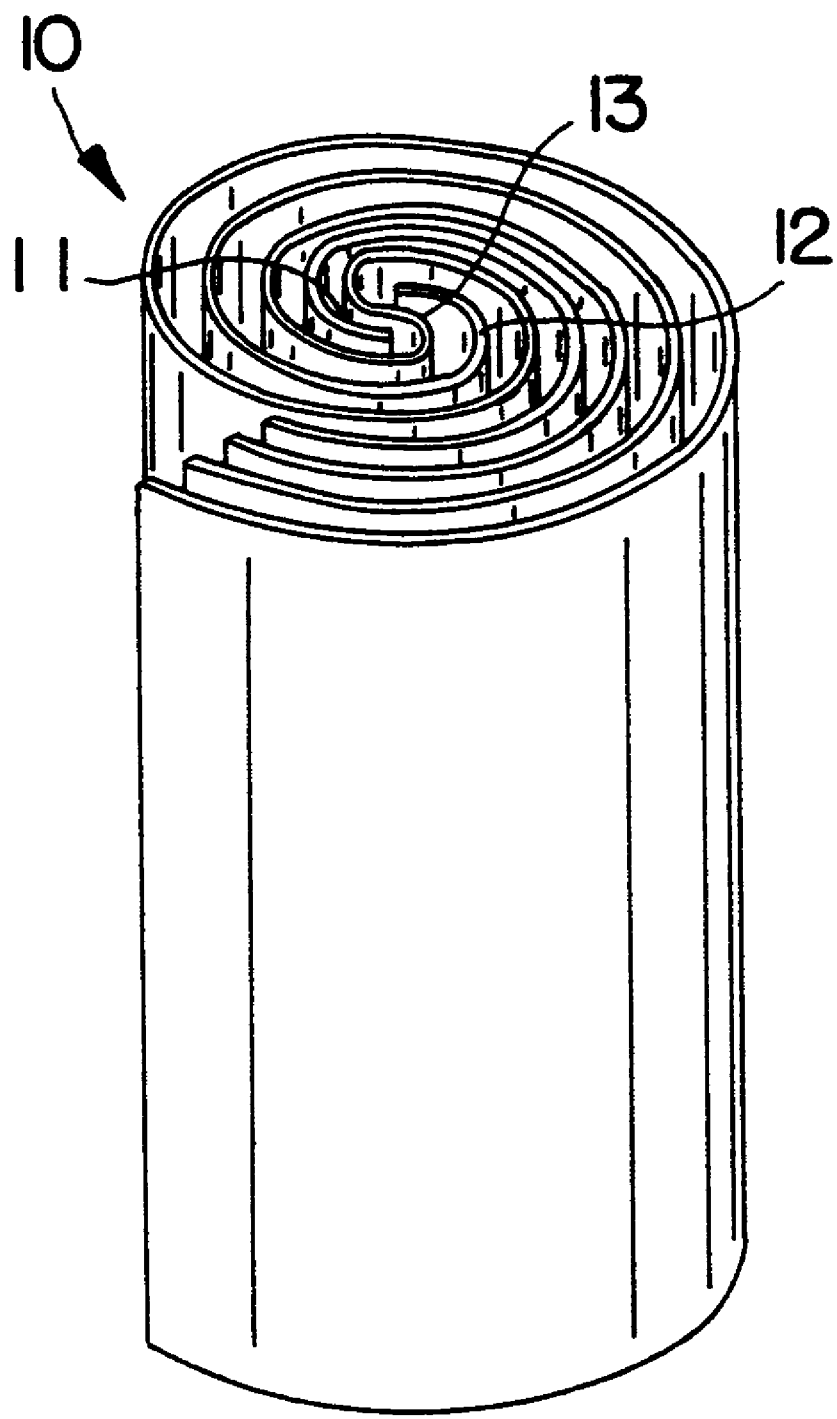
FIG. 1 is a perspective view showing the state in which an electrode composite plate installed in a general cylindrical storage cell is wound.
Figure 2:
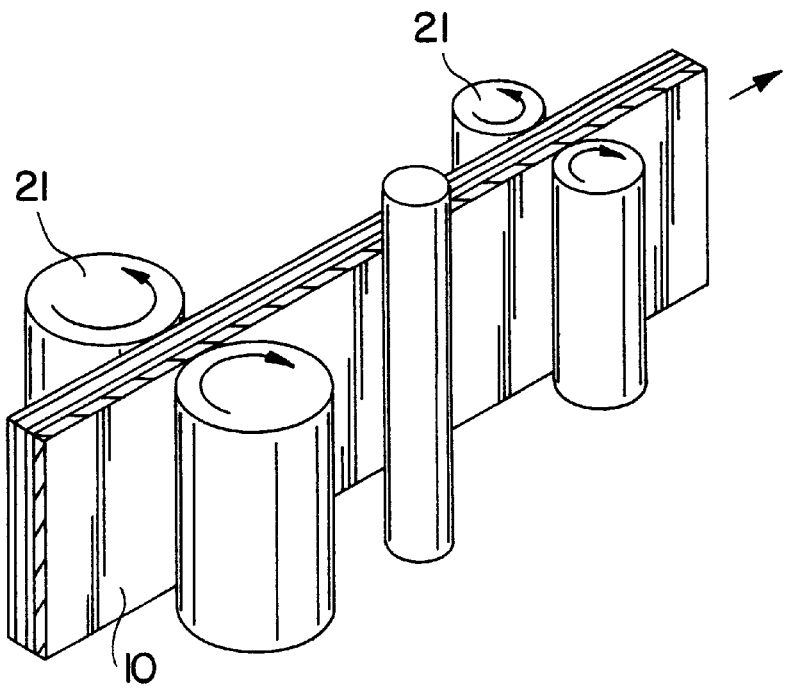
FIG. 2 is a schematical perspective view showing the state in which a conventional roller for rolling an electrode composite plate for a storage cell is used.

Referring to FIGS. 3 and 4, the electrode composite plate 10 passes between a pair of rollers 30 having the above structure according to the present invention and is rolled. At this time, heat is generated by the heating line 33 and is transmitted to the electrode composite plate 10 which passes between the rollers 30. The thickness of the electrode composite plate 10 is controlled by controlling the distance between the rollers 30. Namely, since the anode and cathode electrode plates 11 and 12 (see to FIG. 1) of the electrode composite plate 10 are made of a metal, the thicknesses thereof are not significantly changed by the rollers 30. However, the thickness of the separator 13 (FIG. 1) including a thermoplastic resin such as polyethylene and polypropylene is easily reduced by simultaneous heating and pressing operations. Therefore, the overall thickness of the electrode composite plate 10 can be controlled.

It is nearly impossible to control the thickness of the separator 13 by pressing alone due to the elasticity of the electrode composite plate 10. However, when the heating and pressing operations are simultaneously performed, it is possible to control the thickness of the separator 13 since the material of the separator 13 undergoes a plastic transformation. Here, since the melting point of polyethylene is between 110~137° C. and the melting point of polypropylene is between 165~177° C., the temperature of the heating line 33 is preferably controlled to not damage the polyethylene and polypropylene in the separator 13.

Also, since the malleability and elongation characteristics of the materials of the electrode composite plate 10 are improved by heating, the probability in which the materials are broken by stress concentration during a winding processing is lowered. Also, even if there may be a difference between the speed at which the electrode composite plate 10 is supplied and the speed at which the electrode composite plate 10 is rolled and wound, the risk of damage to the electrode composite plate 10 is lowered by the improved malleability and elongation characteristics. Furthermore, the overall thickness of the electrode composite plate 10 is made uniform.

Figure 5:
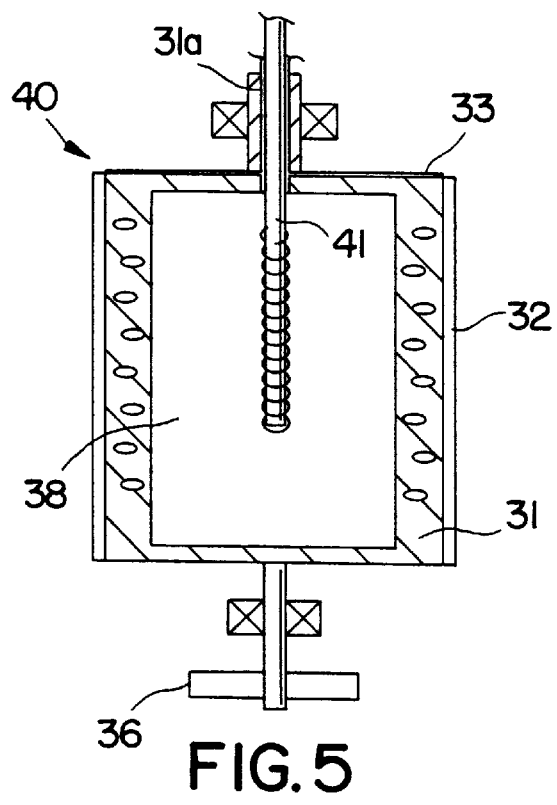
FIG. 5 is a sectional view showing another embodiment of the roller as a drawing similar to FIG. 4.

Another embodiment of a roller for rolling an electrode composite plate for a cell according to the present invention is shown in FIG. 5. In FIG. 5, the same reference numerals as those of FIG. 4 indicate the same elements. Referring to FIG. 5, a heater 41 is further included inside the body 31 in addition to the heating line 33 being buried within the outer circumference of the body 31 in a roller 40 of the present embodiment.

The heater 41 is inserted and installed through the hole 31a formed in the body 31. Also, a thermally conductive material for transmitting the heat generated in the heater 41 to the surface of the body 31 may fill a space 38 between the body 31 and the heater 41. The thermally conductive material may be oil, which is preferable for preventing corrosion of the inside of the body 31.

According to still another embodiment of the present invention which is not shown, the body 31 includes only the heater 41 without a buried heating line 33. Namely, only the heater 41 may be installed as the heating device for heating the electrode composite plate 10.

According to the roller for rolling the electrode composite plate for the cell of the present invention, it is possible to easily and uniformly control the thickness of the electrode composite plate by simultaneously rolling and heating the electrode composite plate and to wind the electrode composite plate more tightly, thereby enabling improved capacity of the cell. Also, it is possible to prevent the break-down of the electrode composite plate due to partial stress concentrations.

What is claimed is:

1. A roller for rolling an electrode composite plate of a storage cell, the roller comprising:
    a cylindrical body having an inner space;
    a heating line beneath an outer surface of said cylindrical body;
    a heater in the inner space; and
    a thermally conductive liquid fully filling the inner space for transmitting heat from said heater to the outer surface of said cylindrical body.

2. The roller as claimed in claim 1, comprising a coating layer on the outer surface of said cylindrical body for contacting an electrode composite plate.

3. The roller as claimed in claim 1, including a hole through the center of the body through which said heater is inserted.

4. The roller as claimed in claim 1, wherein the thermally conductive liquid comprises oil.

5. A roll system for rolling an assembly of positive and negative plates of a battery, the roll system comprising two cylindrical bodies having respective cylindrical axes substantially parallel to each other, at least one of the cylindrical bodies including a hollow inner space, a thermally conductive liquid fully filling the hollow inner space, a heating element located in the hollow inner space, and a resistor embedded beneath an outer surface of the cylindrical body, wherein plates are fed between the two cylindrical bodies and the thermally conductive liquid limits heat transfer from the heating element such that substantially all heat from the resistor is transferred to the plates.

* * * * *